Figure 1:
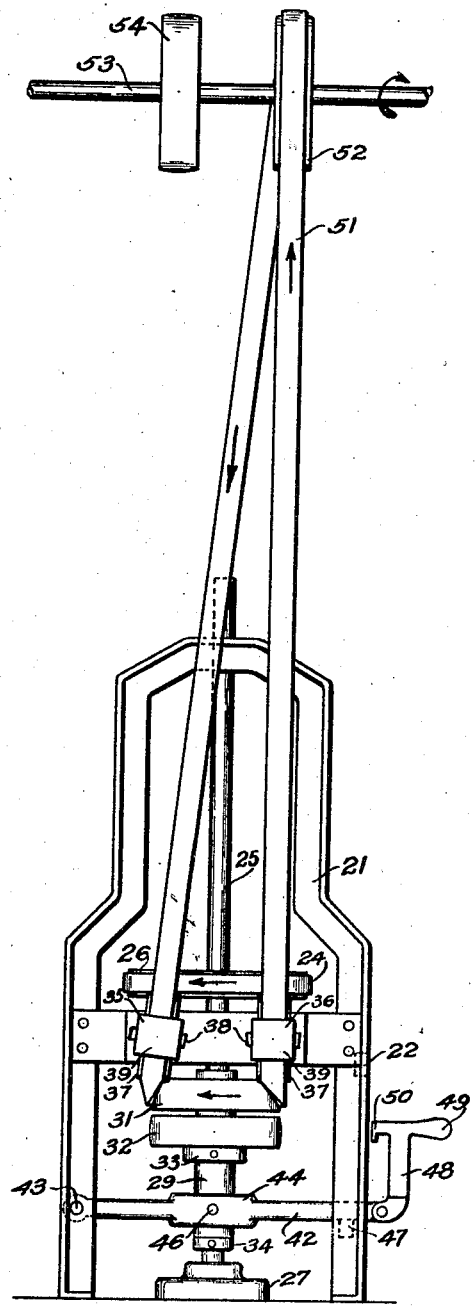

C. E. McGILL.
BELT GEARING.
APPLICATION FILED MAY 6, 1921.

1,437,767.

Patented Dec. 5, 1922.
2 SHEETS—SHEET 1.

INVENTOR
Charles E. McGill
BY
C. E. Beach
ATTORNEY

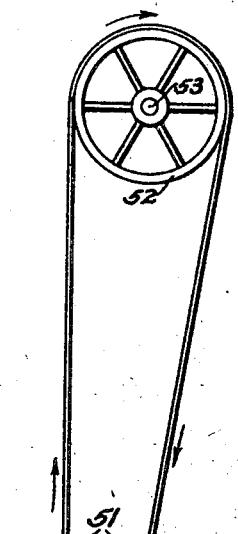
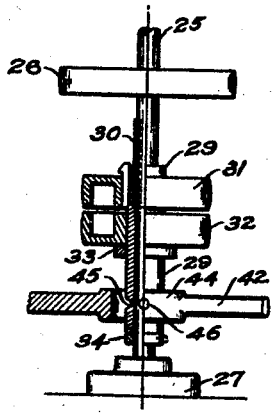
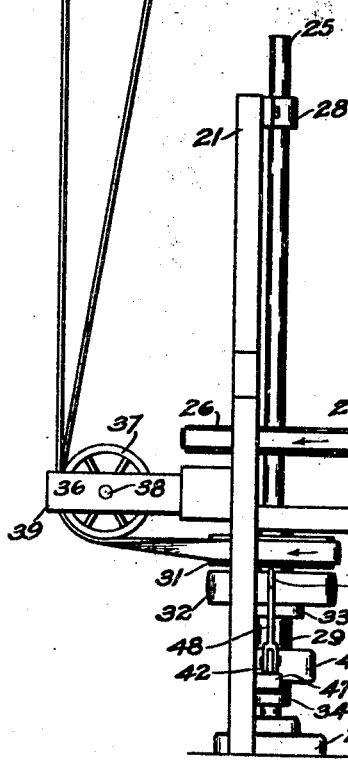
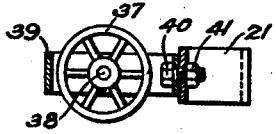

Patented Dec. 5, 1922.

1,437,767

UNITED STATES PATENT OFFICE.

CHARLES E. McGILL, OF BINGHAMTON, NEW YORK.

BELT GEARING.

Application filed May 6, 1921. Serial No. 467,407.

*To all whom it may concern:*

Be it known that I, CHARLES E. MCGILL, a citizen of the United States, residing at Binghamton, county of Broome, and State of New York, have invented certain new and useful Improvements in Belt Gearing, of which the following is a specification.

This invention relates to gearing for driving, starting and stopping belt driven machines, and is particularly suited for such belt gearing of machines having a driven shaft the axis of which is not parallel to the axis of the driving shaft associated therewith.

In prior art spinning machines of the various types with which I am acquainted, the belt gearing for effecting the starting and stopping of such machines acts through the movement of idlers arranged to effect changes in the course of the belt and involving the use of objectionably complicated structure.

Such prior art belt gearing has been incapable of such actuation as to quickly bring the machine controlled thereby to rest; but has, instead, been arranged to so gradually alter the belt course that a very appreciable time is consumed in disengaging the belts of such machines from the tight pulleys and transferring same to the loose pulleys; and the means incident to such transfer does not serve in any way, in such prior art machines, to retard the speed of rotation of the tight pulleys and parts driven thereby.

The action of such prior art machines in diverting the course of the belt has involved movement of idlers so as to lengthen or shorten the distance between such idlers and the tight and loose pulleys incident to the transfer of the belt from one to the other of said pulleys. It is obvious that it requires the exercise of much force to control and operate idlers under the circumstances indicated, when the belt passing over such idlers is carrying a comparatively heavy load. In fact, in the event of accidents to spinning machine structure, the load upon such an idler may become so great as to make it impossible for a person of ordinary strength to unlatch the idler shifting mechanism so as to transfer the driving belt from the tight to the loose pulley.

Such prior art belt gearing has been of a type unsuited for adjustment of a given gearing to provide for the reversal of the direction of rotation of the driven shaft; and it has therefore become customary to provide right and left hand drive gearing one of which must be removed and the other installed in place thereof, whenever it becomes necessary to reverse the direction of rotation of a given machine. It is obvious that the loss of productive time for such a machine incident to such a substitution of the drive gearing thereof, as well as the cost of the services of a mechanic for making such a change, constitute a serious item of expense.

An object of this invention is to provide such a belt gearing whereby the driven machine may be quickly started or stopped.

Another object of this invention is to provide such a gearing whereby the course of the belt will not be materially altered incident to the starting or stopping of the machine, so that it will be unnecessary to move idlers or other parts in a direction substantially parallel to the pull of the belt thereon.

Another object is to provide such a gearing which is so arranged that it may be easily and quickly altered to provide for reversal in direction of operation.

Another object is to provide such a gearing which is more simple, more economical to manufacture, and more durable than gearing heretofore provided for similar purposes.

Still other objects, together with their inherent advantages, will be in part obvious and in part hereinafter more fully described.

In constructing this invention, a sleeve is slidably mounted upon the driven shaft and connected therewith, as by a feather key and key way, so that rotation imparted to said sleeve will be positively transmitted to said shaft.

Tight and loose pulleys are mounted upon said sleeve, and two idlers are provided in approximate alignment with respective opposite faces of said pulleys; said idlers being mounted so that they may be readily moved around an axis substantially perpendicular to the axis of rotation of the driven shaft and of said respective idlers.

Shifting means is provided, such as, for example, an annular groove in the sleeve and a controlling lever mounted adjacent to said groove and arranged to engage therewith for the purpose of sliding said sleeve lengthwise of the driven shaft; suitable locking means being provided for retaining said lever in its extreme positions.

When a vertical driven shaft is employed,—best results will be obtained by mounting the tight pulley above the loose pulley, and providing means, independent of the controlling lever, for supporting the sleeve so as to minimize the stress and wear between the sleeve and the controlling lever incident to the rotation of the shaft.

When a ball bearing is provided for the support of the driven shaft, the lower end of the sleeve may be allowed to rest upon the basket of such bearing for supporting said sleeve while it is positioned to present the tight pulley to the driving belt; otherwise, a collar may be fixed upon the shaft below the sleeve in such position as to correspondingly support said sleeve.

When it is desired to provide for reversal of the direction of relative rotation between the driving and driven shafts, pulley surface should be provided on the driving shaft in alignment with each of the idlers.

For the purpose of enabling this invention to be more readily understood, an illustrative embodiment thereof is shown in the annexed drawings and hereinafter described, but this invention is not limited to the particular arrangement there shown and hereinafter described, as many changes may be made in construction and arrangement and parts may be added or omitted without departing from the spirit of this invention.

Like reference characters denote similar parts throughout the accompanying drawings in which Figure 1 is an end elevation showing the frame and main shaft of a spinning machine embodying this invention;

Fig. 2 is a fragmentary side elevation of the machine of Fig. 1;

Fig. 3 is an elevation of the main shaft of Figs. 1 and 2 and parts carried thereby, certain of said parts being broken away and shown in section in order to more clearly show the relative arrangement thereof; and Fig. 4 is a side elevation of one of the idlers of Figs. 1 and 2, the supporting frame being broken away and shown in section in order to more clearly disclose the facilities provided for adjusting said idlers to suit the course of the belt.

Referring to Figs. 1 and 2, the vertical frame member 21 of a typical spinning machine has secured thereto the horizontal frame member or rail 22 which carries the whirls 23 in position to be suitably driven by the band 24.

A main-shaft 25 is mounted in suitable relation to the frame members 21 and 22 and carries the driving wheel 26 for the band 24.

As is usual in such machines the main-shaft 25 is vertically positioned, so as to carry the band wheel 26 in suitable operating relation to the band 24; the lower end of said shaft being supported by the bearing 27, and the upper end of said shaft being journaled in the bearing 28.

A driving sleeve 29 is carried by the shaft 25, said sleeve being freely slidable lengthwise of said shaft, and said shaft being so connected with said sleeve as to be driven by rotation thereof, as by the agency of the feather key 30 carried by said shaft 25 and cooperating with a suitable keyway formed in the sleeve 29.

The tight pulley 31 is fixed upon the sleeve 29 near the upper end thereof, and the loose pulley 32 is journaled upon said sleeve directly below the pulley 31, being held against movement lengthwise of said sleeve away from said pulley 31 by the collar 33.

Supporting means moving with the shaft 25 is provided for carrying the sleeve 29. Such means may comprise the collar 34 which is fixed upon the shaft 25, or such means may comprise a part of the bearing 27 (as, for example, the basket or ball race of a ball bearing mounted therein).

Guiding means is provided for stabilizing the course of a belt with relation to the tight and loose pulleys so that, when the sleeve 29 is in a certain position the tight pulley 31 will be engaged by such a belt, and so that, when said sleeve is in another position the loose pulley 32 will be engaged by such a belt. Such guiding means comprises the idlers 35 and 36 each of which comprises a pulley 37 having an axle 38 journaled in a carrier frame 39 which is secured to the frame member 21 by means of the bolt 40 which passes through suitable openings in the carrier frame 39 and frame member 21 and is engaged by the nut 41.

The lever 42 is hinged upon the stud 43 carried by one of the side members of the frame 21; said lever comprises a cradle 44 encircling the sleeve 29, adjacent to an annular groove 45 which is formed in said sleeve near the lower end thereof. The cradle 44 carries a pair of lugs 46 which engage the groove 45 for the purpose of sliding the sleeve 29 lengthwise of the shaft 25.

The ledge 47 is carried by the opposite member of the frame 21, and is so positioned as to serve as a support for the lever 42 to hold said lever in such position that when the sleeve 29 is resting upon the collar 34 the lugs 46 will be situated intermediate the side walls of the groove 45.

Combined handle and latch member 48 is hinged to the free end of the lever 42 and comprises a grip 49 and a hooked projection 50 suited for engaging the horizontal frame member 22 for supporting the sleeve 29 and parts carried thereby in elevated position.

The belt 51 connects the tight and loose pulleys 31 and 32 with the driving pulley 52 carried by the line-shaft 53, and an extra driving pulley 54 is shown on the line-shaft 53 positioned for driving the spinning machine in the opposite direction to that for which the pulley 52 is suited; the pulleys 52 and 54 being respectively utilized for driving the pulley 31 in the direction indicated by the arrow shown in Fig. 1 or in the opposite direction (irrespective of the direction of the rotation of the shaft 53), as hereinafter more fully explained.

In utilizing the embodiment of this invention shown in the accompanying drawings, the frame of the idler 35 or 36 toward which the belt will move incident to the intended direction of rotation of the shaft 25 should be so positioned that the axle 38 carried by such frame will be disposed in a line which is substantially perpendicular to the direction of the length of the shaft 25, and the driving pulley provided upon the line-shaft 53 should be so positioned that the sides of the belt face of said pulley will be substantially equidistant from a line perpendicular to said shaft 53 and intersecting the axis of rotation around the associated bolt 40 of the one of the carrier frames 39 toward which the belt will move after leaving the pulleys 31 and 32. The other one of said idler frames should be so rotated around the supporting bolt 40 that an extension of a line perpendicular to the axle 38 of said other idler and disposed intermediate the sides of the pulley carried thereby will intersect the center line of the belt face of the driving pulley at or near the point where the belt will leave said pulley in moving toward the tight and loose pulleys 31 and 32.

From the foregoing it will be observed that with the improved arrangement of this invention a belt gearing is provided which is adjustable for either right or left hand driving of the shaft 25 from a line-shaft having either right or left hand rotation, merely by positioning the idler which receives the belt from the pulleys 31 and 32 so as to maintain the side of the pulley carried thereby parallel to the shaft 25, and positioning the idler which receives the belt from the driving pulley of the line-shaft so that a projection of the belt face of said pulley will intersect the center line of the belt face of said driving pulley at the point where the belt leaves said driving face in moving toward such idler pulley. Such adjustments of the idlers 35 and 36 can be very readily accomplished by loosening the nuts 41 and rotating the frames 39 so that the pulleys 37 will properly align with the course of the belt 51; and said frames should thereupon be secured in position by tightening the respective nuts 41.

In the operation of the embodiment of this invention shown in the accompanying drawings,—when the parts are positioned as shown, the rotation of the shaft 53 in the direction indicated by the arrow will cause the pulley 52 to drive the belt 51 so as to rotate the tight pulley 31, the sleeve 29, the shaft 25, and the band wheel 26, so as to propel the band 24 and thereby operate the whirls 23. While so operating, the weight of the sleeve 29 and parts carried thereby will be supported by the collar 34 rotating therewith, and friction between said parts will thus be eliminated; and the lever 42 will be supported by the ledge 47 in such position that the lugs 46 will be disposed intermediate the side walls of the groove 45, thus eliminating all appreciable friction between said parts.

When it is desired to stop the spinning machine, the grip 49 should be grasped and the lever 42 should be raised until the hooked projection 50 is slightly above the rail 22, whereupon said projection should be hooked over said rail. The movement imparted to the lever 42, incident to raising the member 48, as just described, will so elevate the sleeve 29 as to carry the tight pulley 31 out of the course of the belt 51 and to carry the loose pulley 32 into the path of said belt. When the sleeve 29 is elevated, as just described, the machine will be quickly brought to rest; not only because of the driving torque of the belt 51 will be no longer transmitted thereto through the tight pulley 31, but for the further reason that the friction between the lugs 46 and the upper wall of the groove 45 will serve to absorb the momentum of the shaft 25 and parts moving therewith to a very appreciable extent.

When it is desired to again start the spinning machine the grip 49 should be grasped and lifted slightly and moved so as to disengage the projection 50 from the rail 22; the member 48 and lever 42 should thereupon be permitted to move downwardly until said lever rests upon the ledge 47 whereupon the incidental movement of the sleeve 29 will have brought the tight pulley 31 into the course of the belt 51.

Should it be desired to operate the spinning machine shown, in the opposite direction, the belt 51 should be transferred from the pulley 52 to the pulley 54, and the position of the idlers 35 and 36 relative to the shaft 25 should be reversed; the belt being so wrapped around the pulley 54 that, as determined by the direction of the rotation of the shaft 53, the side of the belt 51 approaching the pulling side of said pulley will be that delivered by the idler 35 and so that the side of the belt leaving the pulley 54 will proceed therefrom to the idler 36.

Should it be desired to reverse the rotation of the shaft 53 without reversing the rotation of the shaft 25, the idlers 35 and 36 should be arranged as shown, but the belt 51 should be wrapped around the pulley 52 in the opposite direction from that shown; i. e., the side of the belt which ascends from the idler 36 should pass to the rear side of the pulley 52 (as shown in Fig. 1) and the side of the belt which leaves the opposite face of said pulley should pass to the idler 35.

What I claim and desire to secure by Letters Patent of the United States of America is:—

1. In a belt gearing,—a driven shaft, a driving sleeve carried by said shaft and slidable lengthwise thereof, tight and loose pulleys carried by said sleeve, guiding means for stabilizing the course of a belt with relation to the length of said shaft, and shifting means for sliding said sleeve so as to bring one or the other of said pulleys into alignment with such belt course.

2. In a belt gearing,—a driven shaft, a driving sleeve carried by said shaft and slidable lengthwise thereof, tight and loose pulleys carried by said sleeve, guiding means for stabilizing the course of a belt with relation to said shaft, shifting means for a sliding said sleeve so as to bring one or the other of said pulleys into alignment with such belt course, and means independent of said shifting means and moving with said shaft for preventing downward movement of said sleeve such as would carry said tight pulley out of such belt course.

3. In a belt gearing,—a driven shaft, a driving sleeve carried by said shaft and slidable lengthwise thereof, tight and loose pulleys carried by said sleeve, guiding means for stabilizing the course of a belt with relation to the length of said shaft, for sliding said sleeve so as to bring one or the other of said pulleys into alignment with such belt course, and supporting means moving with said shaft for preventing downward movement of said sleeve such as would carry said tight pulley out of such belt course.

4. In a belt gearing,—a vertical driven shaft, a driving sleeve carried by said shaft and slidable lengthwise thereof, tight and loose pulleys carried by said sleeve, guiding means for stabilizing the course of a belt with relation to the length of said shaft, shifting means for sliding said sleeve so as to bring one or the other of said pulleys into alignment with such belt course, and supporting means moving with said shaft for limiting the downward movement of said sleeve.

5. In a belt gearing,—a driven shaft, a driving sleeve carried by said shaft and slidable lengthwise thereof, tight and loose pulleys carried by said sleeve, shifting means for sliding said sleeve, and guiding means comprising two idler pulleys so disposed as to be suited for guiding a belt to and from said tight and loose pulleys.

6. In a belt gearing,—a driven shaft, a driving sleeve carried by said shaft and slidable lengthwise thereof, tight and loose pulleys carried by said sleeve, shifting means for sliding said sleeve, and guiding means comprising two idler pulleys supported at respective sides of said tight and loose pulleys and so independently adjustable as to enable said idler pulleys to guide a belt to and from said tight and loose pulleys and to accomplish a change in the direction of the run of such belt adjacent said tight and loose pulleys.

7. In a belt gearing,—a driven shaft, a driving sleeve carried by said shaft and slidable lengthwise thereof, tight and loose pulleys carried by said sleeve, shifting means for sliding said sleeve, and guiding means comprising two idler pulleys so independently adjustable as to enable them to conform to either direction of belt travel in guiding a belt to and from said tight and loose pulleys.

8. In a belt gearing,—a driven shaft, a driving sleeve carried by said shaft and slidable lengthwise thereof, tight and loose pulleys carried by said sleeve, shifting means for sliding said sleeve, and guiding means comprising two idler pulleys, carrier frames in which said idler pulleys are journaled, and means associated with each of said frames for securing same in position suitable for guiding a belt to and from said tight and loose pulleys for either direction of rotation thereof.

9. In a belt gearing,—a driven shaft, a driving sleeve carried by said shaft and slidable lengthwise thereof, tight and loose pulleys carried by said sleeve, shifting means for sliding said sleeve, and guiding means comprising two idler pulleys, carrier frames in which said idler pulleys are journaled each having an opening therethrough substantially perpendicular to the axis of rotation of the pulley carried thereby, bolts passing through said respective openings around which said frames may swivel, and a frame associated with said driven shaft comprising a member arranged to receive said bolts and thereby hold said frames against swiveling.

10. In a belt gearing for a spinning machine having a suitable frame,—a vertical main-shaft, a driving sleeve carried by said shaft and slidable lengthwise thereof, tight and loose pulleys carried by said sleeve, shifting means for raising and lowering said sleeve, and guiding means for stabilizing the course of a belt with relation to the length of said shaft.

11. In a belt gearing for a spinning machine,—a vertical main-shaft, a driving sleeve carried by said shaft and slidable lengthwise thereof, tight and loose pulleys carried by said sleeve, said tight pulley being situated above said loose pulley, supporting means rotating with said shaft for limiting the downward movement of said sleeve, shifting means for lifting said sleeve above said supporting means, and guiding means arranged to direct a belt to and from said tight pulley when said sleeve is positioned to engage said supporting means.

12. In a belt gearing for a spinning machine,—a vertical main-shaft, a driving sleeve carried by said shaft and slidable lengthwise thereof, tight and loose pulleys carried by said sleeve, guiding means for stabilizing the course of a belt with relation to the length of said shaft, shifting means for sliding said sleeve so as to bring one or the other of said pulleys into alignment with such belt course and supporting means independent of said shifting means and moving with said shaft for preventing downward movement of said sleeve when said tight pulley is in such belt course.

In witness whereof, I hereunto subscribe my name this 5th day of May, 1921.

CHARLES E. McGILL.